UNITED STATES PATENT OFFICE.

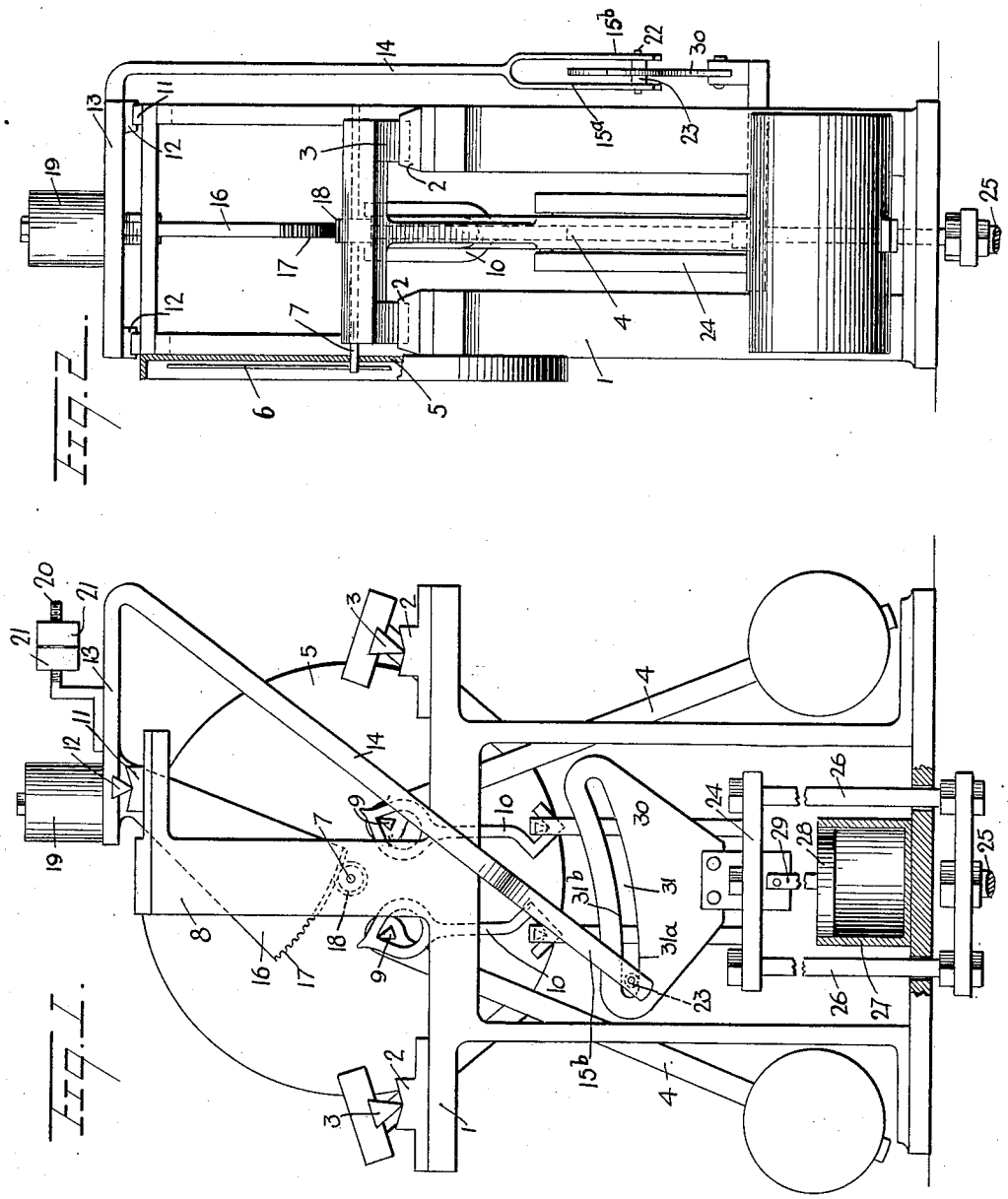

ISRAEL CHARET, OF NEW YORK, N. Y.

SCALE.

1,102,137. Specification of Letters Patent. Patented June 30, 1914.

Application filed December 2, 1912. Serial No. 734,511.

*To all whom it may concern:*

Be it known that I, ISRAEL CHARET, a subject of the Czar of Russia, and a resident of the city of New York, borough of Brooklyn, in the county of Kings and State of New York, have invented a new and Improved Scale, of which the following is a full, clear, and exact description.

This invention relates generally to scales, and is more particularly directed to improvements in and relating to scale heads such as set forth in my co-pending application, Serial No. 668,283, filed December 28, 1911.

The principal object of the present invention is a new and improved construction or articulation between the actuating mechanism and the indicating mechanism.

In the performance of the invention means are utilized which tend to cause movement of the pointer over the scale, such means being held inoperative, the said means functioning, however, when a load is placed on the scales.

The principal purpose sought is the reduction or substantial elimination of friction between the actuating mechanism and the indicating mechanism.

Reference is to be had to the accompanying drawings forming a part of this specification, in which similar characters of reference indicate corresponding parts in both the views, and in which—

Figure 1 is a rear view of a scale head; while Fig. 2 is a side view, partly sectional.

The structure chosen to illustrate the invention comprehends supports 1 carrying bearings 2 receiving knife-edges 3, whereby the weighted arms or levers 4 are maintained in position; the structure further comprehends a dial 5 bearing a series of marks, and a pointer 6 playing over the dial and mounted at the outer end of a spindle 7, preferably mounted in suitable bearings carried by the upright 8. Adjacent the upper ends of the weighted arms 4 are knife-edges 9 carrying hooks 10 to which the draft rod mechanism is connected; the structure set forth is substantially the same as that described in the co-pending application hereinbefore referred to.

Movably mounted on the bearings 11 by means of knife-edges 12 is a bar made up of the substantially horizontal portion 13 and the diagonal portion 14 having a bifurcated lower end and comprising the sides $15^a$—$15^b$; extending downwardly from the horizontal portion 13 of this bar is what is termed a sector 16, having a number of teeth 17 thereon which engage with a pinion 18 mounted on the said spindle 7 which carries the pointer 6. From the description thus far set forth any movement of the arm will swing the pointer over the scale or dial 5. Carried by the horizontal arm 13, and preferably on the top side, is a mass of material 19, it being particularly noted that the longitudinal central axis of this mass of material lies to one side, in this instance toward the left, of the vertical plane passing through the points of engagement of the knife-edges 12 with the bearings 11; also mounted on this horizontal portion 13 is a threaded rod 20 having a weight 21 adjustable therealong and adapted to serve the purposes of a counterpoise. Because of the relation between the central axis of the mass of material 19 and the knife-edge supports of the bar, this structure if left to itself will tend to turn in a counter-clockwise direction about the said knife-edges due to the moment of the force represented by the said mass of material.

Extending between the sides $15^a$—$15^b$ of the bifurcated end of the diagonal portion 14 of the bar is a spindle 22 having a roller 23 thereon. Extending downwardly from the said hooks 10 mounted at the upper ends of the weighted arms 4 is a substantially U-shaped structure 24 connected with the draft rod 25 of the scales by means of the spaced sides 26; fixed in position adjacent the draft rod is a cylinder 27 having a piston 28 fitted therein, the said piston being connected to the U-shaped structure 24 in any suitable manner, as by means of a rod 29. The cylinder and the piston form a dashpot which tends to steady the action of the scale head when the draft rod 25 is moved because of a load placed on the platform of the scale. Fixed to the U-shaped structure 24 is a plate 30 having a slot 31 therein, the slot being determined by the side walls $31^a$—$31^b$. The width of this slot is immaterial, and the length thereof will depend upon the proportion existing between the downward movement of the draft rod and the swing of the bar moving the pointer 6.

Referring particularly to Fig. 1 it will be noted that the roller 23 carried at the end of the diagonal portion 14 of the bar normally engages the lower side wall 31ª of the slot 31; this particular relation between the roller and the side wall of the slot provides for a substantial elimination of friction between the actuating mechanism and the indicating mechanism, since the tendency of the mass of material 19, which is located to one side of the center of rotation of the bar, moves the pointer, the normal tendency of the lower end of the portion 14 of this bar is to turn in a counter-clockwise direction; due, however, to the fact that the roller 23 engages the lower side wall 31ª of the slot, such rotation is prevented. If, now, the draft rod 25 is pulled down, as by the presence of a load on the platform of the scales, such downward movement of the rod does not directly actuate the indicating mechanism, but merely results in a lowering of the plate 30, thereby permitting the mass of material 19 to turn the bar about the knife-edges 12, the amount of turning being determined by the downward movement of the draft rod, since, after a certain amount of movement, the roller 23 will again engage this lower side wall 31ª in a slot, thereby preventing further rotation of the bar. The placing of the load, then, on the scales does not directly move the indicating mechanism; that is, its action is not positive, but is rather, as it were, negative, since the indicating mechanism will always operate on its own account, being merely prevented from operating because of the bottom wall 31ª of the said slot.

The width of the slot 31 may be such that both side walls thereof may engage with the roller 23, or the roller may engage with the top side wall 31ᵇ; in such event, with the relation shown between the mass of material 19 and the center of rotation of the bar, the roller would be brought into engagement with the lower side wall 31ª; in the event that the diameter of the roller was substantially equal to the width of the slot, then the downward movement of the draft rod would positively actuate the indicating mechanism, the mass of material 19 then serving as a sort of counter-poise in order to substantially reduce friction between the side walls and the roller. It is clear, of course, that this relative engagement of parts, that is, between the moving draft rod or its equivalent and the indicating mechanism, may be availed of in many different scales and in many different mechanical structures, the inventive idea remaining the same. The particular scale head shown is chosen merely because of the fact that the invention is particularly adapted to such a scale head.

The provision of the dashpot provides for steady operation of the parts, and substantially prevents the to-and-fro movement of the pointer over the scale when a load has been placed on the platform. The dashpot may, of course, be placed at other portions of the scale as an entirety rather than in the head, it being illustrated in such position since such a location is a convenient one.

Having thus described my invention, what I claim as new and desire to secure by Letters Patent is:—

1. In a device of the character described, a weighing mechanism, a pointer for indicating the degree of actuation of the weighing mechanism, means for actuating said pointer independently of said weighing mechanism and means actuated by the weighing mechanism for controlling said first mentioned means, said last mentioned means including a controlling bar for said first mentioned means, a reciprocating plate operated by said weighing mechanism, said reciprocating plate being formed with an arc-shaped slot extending substantially at right angles to the direction of movement of said reciprocating plate and a pin connected with said controlling bar projecting into said slot whereby whenever said plate is moved said controlling bar is permitted movement.

2. In a device of the character described, a weighing mechanism, an indicator, and means controlled by said weighing mechanism for operating said indicator, said means including a substantially L-shaped bar, a pivotal member arranged on one leg of said bar, a weight arranged on said last mentioned leg of said bar whereby said bar is normally over-balanced, and means for connecting the opposite leg with said weighing mechanism whereby when the weighing mechanism is moved, the weight on said first mentioned leg will cause the actuation of said indicator.

3. In a device of the character described, a weighing mechanism, an indicator, and means controlled by said weighing mechanism designed to operate said indicator, said means including a bar formed with an offset member, a pivotal member arranged on said offset member, a weight arranged near one end of said offset member for over-balancing said bar, and causing the same to normally tend to move on said pivot in a certain direction, means for connecting said offset member and said indicator for actuating the indicator when the offset member is moved pivotally, and means for connecting said bar slidingly with said weighing mechanism whereby when said weighing mechanism is actuated said bar will be moved pivotally by the action of said weight, and said indicator will be operated at a direct ratio to the operation of the weighing mechanism.

4. In a device of the character described, a weighing mechanism, a plate rigidly secured to the draft member thereof, said plate being formed with a slot with one end in a higher plane than the other, said slot being arranged substantially on the arc of a circle, a pivotally mounted bar having a bearing member arranged in said slot, whereby said bar may be moved pivotally as said plate carrying said slot is moved with said draft member, means for tending to continually actuate said bar for moving the same pivotally, an indicating member, and means for connecting said bar and said indicating member for causing the actuation of said indicating member when said bar is moved pivotally, said actuation being in direct proportion to the movement of said bar, and the movement of said draft member.

5. In a device of the character described, a weighing mechanism, an indicator, means controlled by said weighing mechanism for operating said indicator, said means including a bar, a pivotal member arranged near one end of said bar, a weight arranged on said end, whereby said bar is normally overbalanced, means for slidingly connecting the opposite end of said bar with said weighing mechanism, whereby when said weighing mechanism is moved said weight will cause said bar to be moved, and will cause the actuation of said indicator.

6. In a device of the character described, a weighing mechanism, an indicator, means for operating said indicator, a bar connected with said means for actuating the same, means for pivotally mounting said bar intermediate its length, a weight arranged in one end of said bar for overbalancing the bar, a plate secured to said weighing mechanism and moved thereby, said plate having an arc-shaped groove therein, said arc-shaped groove extending substantially at right angles to the direction of said bar, and a connecting member projecting from said bar into said groove, whereby said bar is released in the proportion to the movement of said plate, said bar being actuated by said weight.

7. In a device of the character described, a weighing mechanism, an indicator, means controlled by said weighing mechanism for operating said indicator, said means including a bar, a pivotal member arranged on said bar, a weight arranged on one end of said bar, whereby said bar is overbalanced, an adjustable weight arranged on said bar and opposite said pivotal member, whereby the action of said first mentioned weight may be varied, means for connecting the opposite end of said bar and the end carrying said weight with said weighing mechanism, whereby when the weighing mechanism is moved said first mentioned weight will cause the actuation of said indicator.

In testimony whereof I have signed my name to this specification in the presence of two subscribing witnesses.

ISRAEL CHARET.

Witnesses:
PHILIP D. ROLLHAUS,
LAURENCE J. GALLAGHER.

Copies of this patent may be obtained for five cents each, by addressing the "Commissioner of Patents, Washington, D. C."